United States Patent
Wolin et al.

(10) Patent No.: US 7,020,803 B2
(45) Date of Patent: Mar. 28, 2006

(54) SYSTEM AND METHODS FOR FAULT PATH TESTING THROUGH AUTOMATED ERROR INJECTION

(75) Inventors: Dale Haddon Wolin, Eagle, ID (US); Barry J Oldfield, Boise, ID (US); Robert A. Rust, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 10/097,054

(22) Filed: Mar. 11, 2002

(65) Prior Publication Data

US 2003/0172321 A1 Sep. 11, 2003

(51) Int. Cl.
*G06F 11/00* (2006.01)

(52) U.S. Cl. .......................................... 714/41; 714/25
(58) Field of Classification Search .................. 714/40, 714/41; 326/62, 63, 80
See application file for complete search history.

(56) References Cited

U.S. PATENT DOCUMENTS

| | | | | |
|---|---|---|---|---|
| 4,875,209 A | * | 10/1989 | Mathewes et al. | 714/703 |
| 5,001,712 A | * | 3/1991 | Splett et al. | 714/703 |
| 5,036,455 A | * | 7/1991 | Atwood | 714/22 |
| 5,550,844 A | * | 8/1996 | Lucas | 714/734 |
| 5,574,855 A | * | 11/1996 | Rosich et al. | 714/41 |
| 6,014,504 A | * | 1/2000 | Saine et al. | 716/4 |
| 6,262,871 B1 | * | 7/2001 | Nemir et al. | 361/42 |
| 6,490,544 B1 | * | 12/2002 | Diamond et al. | 702/186 |
| 6,647,516 B1 | * | 11/2003 | Rust et al. | 714/48 |
| 6,842,318 B1 | * | 1/2005 | Comeau | 361/56 |
| 6,886,116 B1 | * | 4/2005 | MacLellan et al. | 714/703 |
| 2002/0063580 A1 | * | 5/2002 | Esch | 326/63 |
| 2003/0071662 A1 | * | 4/2003 | Kwong | 327/112 |
| 2004/0257728 A1 | * | 12/2004 | Hu | 361/56 |

OTHER PUBLICATIONS

Prinetto et al., "Fault behavior observation of a microprocessor system through a VHDL simulation-based fault injection experiment," Sep. 1996, IEEE Computer Society Press, Proceedings of the conference on European design automation.*

* cited by examiner

*Primary Examiner*—Scott Baderman
*Assistant Examiner*—Paul Contino (57) ABSTRACT

The system and methods described herein relate to testing and verifying the fault tolerance in fault tolerant systems. Fault logic integrated into a fault tolerant system permits automated testing of fault paths in system firmware and hardware dedicated to handling fault scenarios. Advantages of the disclosed system and methods include the ability to inject errors without the need to modify system firmware or hardware. Errors can be injected in a controlled manner and asynchronously to normal system firmware execution which permits improved coverage of firmware error paths. The automated error injection capability disclosed is applicable in both the development and production of fault tolerant systems.

32 Claims, 6 Drawing Sheets

SYSTEM AND METHODS FOR FAULT PATH TESTING THROUGH AUTOMATED ERROR INJECTION

TECHNICAL FIELD

The present disclosure relates to fault tolerant systems, and more particularly, to the validation of fault tolerance mechanisms within such systems through fault/error injection.

BACKGROUND

RAID (redundant array of independent disks) disk arrays are a type of fault tolerant storage technology developed in response to an ever-increasing need for uninterrupted availability of data. RAID disk arrays are designed to provide unperturbed access to large amounts of data stored on computer systems. Such disk arrays typically include redundant components such as controllers and power supplies, in addition to providing hot-swap capabilities for modules (i.e., an ability to change-out modules without powering down the system). Because the loss of access to data translates directly into lost productivity, such fault tolerant storage systems often play a critical role in the success of many business operations.

A significant challenge in the development of fault tolerant systems is that of validating fault tolerance mechanisms designed into the systems. Firmware written for embedded controllers in such systems has significant portions of code dedicated to handling various fault scenarios. However, the firmware code written to handle faults is typically much harder to evaluate than the firmware code written to support normal system operations. While normal system operations can be evaluated through the use of benchmark programs, a system's tolerance to faults cannot. In addition, designers do not have the luxury of allowing a system to run for many years in order to observe its behavior under various fault events that may or may not occur. The generally accepted solution to this problem, therefore, is to inject faults into the system and to observe the behavior of the system under the injected faults.

There are, however, numerous difficulties and disadvantages with conventional methods of implementing fault/error injection. For example, in a fault tolerant storage system such as a disk array, mimicking errors in system memories requires accessing the memory to corrupt the memory content. This is typically accomplished by embedding some temporary test code in the firmware to purposely corrupt the memory. However, the embedded test code modifies the firmware code paths and has a fixed timing relationship between the error occurrence and code execution. By contrast, real errors occur with a more random distribution. In addition, this method does not allow for a full test of the "final code", because the test code must be removed before the system is shipped to a customer.

Another typical method of implementing fault/error injections in a fault tolerant system is to connect special fault generation circuitry to the system. For example, system controller boards can be modified into test boards that include circuitry that permits the grounding of particular inputs and outputs on the controller when a switch is thrown. However, these testing modifications are typically intrusive and often result in degraded performance of the controller boards. For example, point-to-point, high-speed data interfaces on controller boards can be disrupted by the addition of small test pads. In addition, because such modifications are extensive, there is typically a tradeoff between the number of test boards that can feasibly be produced and the number of error types that can be injected. Therefore, it is virtually impossible to exercise the hundreds or thousands of fault paths that exist within the firmware on most fault tolerant systems.

Modifying system controller boards into test boards for fault/error injection testing is also problematic from a project development perspective. For example, any given project will have some number of controllers at various levels of revision. Therefore, modifications have to be re-applied for each new version of controller hardware. However, because the modifications are unique, the significant effort required to automate testing for each modified revision is typically not undertaken, and the degree of error injection test coverage is significantly reduced.

Accordingly, the need exists for a way to verify the fault tolerance of fault tolerant systems that does not disturb the normal execution of firmware or otherwise degrade the performance of controllers within such systems.

SUMMARY

A system and methods employ fault logic integrated into a controller of a fault tolerant system in order to simulate errors in the fault tolerant system. The fault logic interprets and implements fault instructions received from sources both internal and external to the fault tolerant system. The fault logic functions independently from normal system operations but is fully integrated within the fault tolerant system to provide error simulation.

In one embodiment, a fault tolerant system includes fault logic that injects faults into the system as part of a power-on self-test. The fault tolerant system includes a controller board having a memory control ASIC (application specific integrated circuit) that generally controls data storage and retrieval, data manipulation, redundancy management, and the like. The fault logic is integrated into the memory control ASIC, but functions independently of the ASIC's normal operations. An onboard processor executing a fault module calls upon the fault logic to inject faults into the system as part of the power-on self-test. The system must pass the self-test before the hardware can begin functioning as part of normal system operations.

In another embodiment, a similar fault tolerant system includes fault logic integrated into a memory control ASIC on a controller board. The system further includes a fault injection port that is distinct from the normal system communications port. The fault injection port permits an external test/host computer to be coupled to the fault tolerant system. The test/host computer is configured to generate fault instructions through executing a fault module. The fault instructions are injected into the fault logic through the fault injection port. The fault logic interprets the fault instructions and implements them to produce simulated faults throughout the system.

BRIEF DESCRIPTION OF THE DRAWINGS

The same reference numbers are used throughout the drawings to reference like components and features.

DETAILED DESCRIPTION

The system and methods described herein relate to testing and verifying the fault tolerance in fault tolerant systems. Fault logic integrated into a fault tolerant system permits automated testing of fault paths in system firmware and hardware dedicated to handling fault scenarios. Advantages of the disclosed system and methods include the ability to inject errors without the need to modify system firmware or hardware. Errors can be injected in a controlled manner and asynchronously to normal system firmware execution which permits improved coverage of firmware error paths. The automated error injection capability disclosed is applicable in both the development and production of fault tolerant systems.

Figure 1:
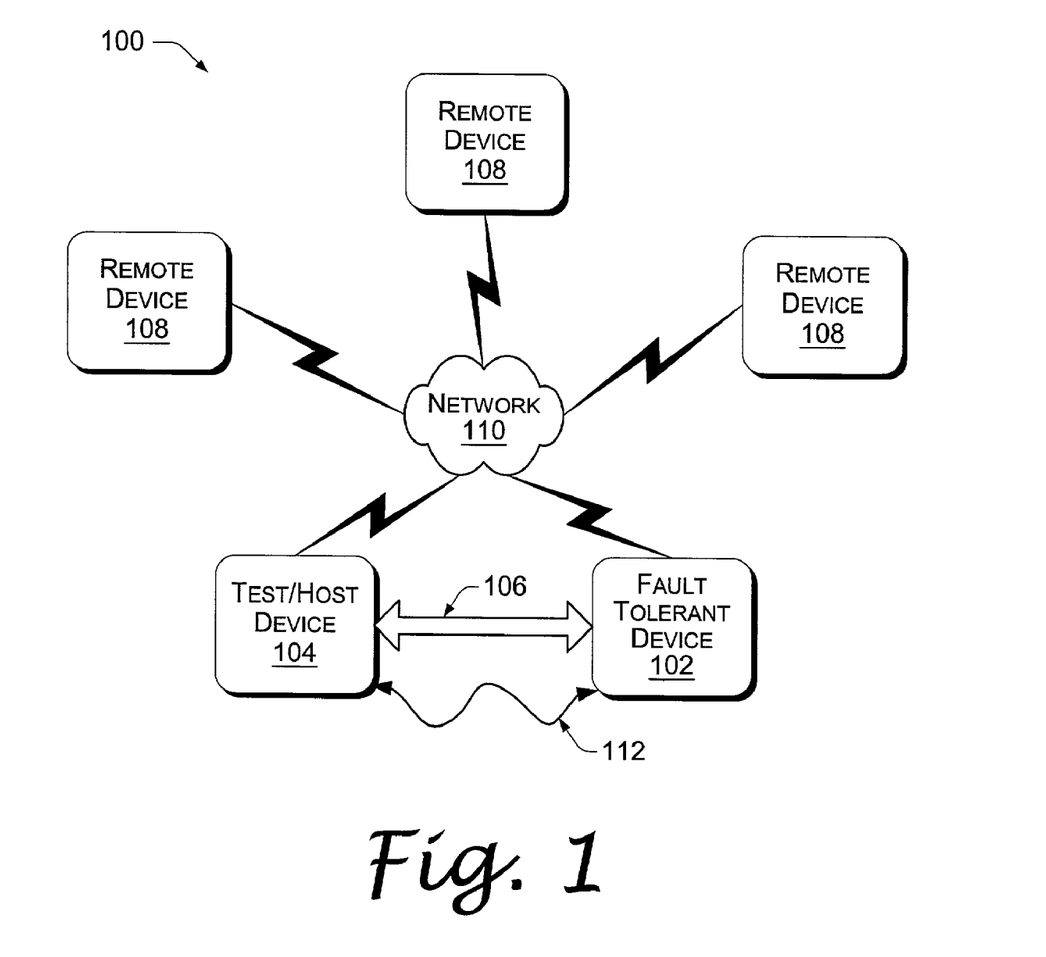
FIG. 1 illustrates a system environment that is suitable for fault path testing of a fault tolerant device through automated error injection.

Exemplary System Environment for Fault Path Testing of a Fault Tolerant Device Through Automated Error Injection FIG. 1 illustrates a system environment 100 that is suitable for implementing fault path testing in a fault tolerant device through automated error injection. The phrase "automated error injection" as used throughout this disclosure includes error injection that is achieved without the use of temporary "test code" to modify standard system firmware. Thus, no modification of firmware in a fault tolerant system is required for automated error injection as discussed herein. "Automated error injection" as used throughout this disclosure further includes error injection that is achieved without the need for hardware modifications. Thus, controllers in fault tolerant systems require no hardware modification for automated error injection as discussed herein.

The system environment 100 of FIG. 1 includes fault tolerant device 102 operatively coupled to test/host device 104 through a direct communication connection 106. Direct connection 106 can include various communication links such as a parallel bi-directional universal serial bus (USB), a fiber optic cable link or "fiber channel", a serial interface bus, or any other suitable interface known in the art. The system environment 100 may also include additional remote device(s) 108 coupled to fault tolerant device 102 and test/host device 104 through network 110. The network connection 110 can include, for example, a LAN (local area network), a WAN (wide area network), an intranet, the Internet, a fiber optic cable link, or any other suitable communication link.

Test/host device 104 and remote device(s) 108 can be implemented as a variety of general purpose computing devices including, for example, a personal computer (PC), a laptop computer, a server, a Web server, and other devices configured to communicate with fault tolerant device 102. It is important to note that although test/host device 104 may be generally disposed as a host computer supporting or being supported by fault tolerant device 102, test/host device 104 may also be specifically disposed in a temporary manner as a testing device to facilitate fault/error injection for fault tolerant device 102. Thus, test/host device 104 may be, for example, a laptop computer that is temporarily coupled to fault tolerant device 102 for the sole purpose of facilitating fault/error injection testing of fault tolerant device 102.

This disclosure is applicable to various types of fault tolerant devices 102. Such devices 102 are typically part of a system whose down-time tolerance is very low or nonexistent. Examples of fault tolerant devices 102 suitable for use in system environment 100 of FIG. 1 may include an Internet server or a disk array supporting such a server that are designed to provide uninterrupted availability of data for users of an Internet service provider. Other examples of fault tolerant devices 102 to which this disclosure applies include devices not necessarily suitable for use in system environment 100 of FIG. 1. Thus, other fault tolerant devices 102 to which this disclosure applies also include those that function more independent of a networked environment such as computer systems on jet airliners or on the space shuttle.

In general, such fault tolerant devices 102 include a degree of subsystem redundancy that permits continued operation during the fault of any one of the device's 102 subsystems. Firmware executing on such devices 102 is configured to detect and respond to faults in a tolerant manner. Fault tolerance is generally well understood to those skilled in the art and may include, for example, preventing the corruption of system data during a fault, working around a detected fault through a redundant subsystem to prevent the system from crashing, and the like.

In addition to direct communication connection 106 between fault tolerant device 102 and test/host device 104, the system environment 100 of FIG. 1 may also include an independent connection 112 such as a serial interconnect bus between fault tolerant device 102 and test/host device 104. Independent connection 112 is used in a particular embodiment for asynchronous error/fault injection into fault tolerant device 102 as more fully described herein below.

Figure 2:
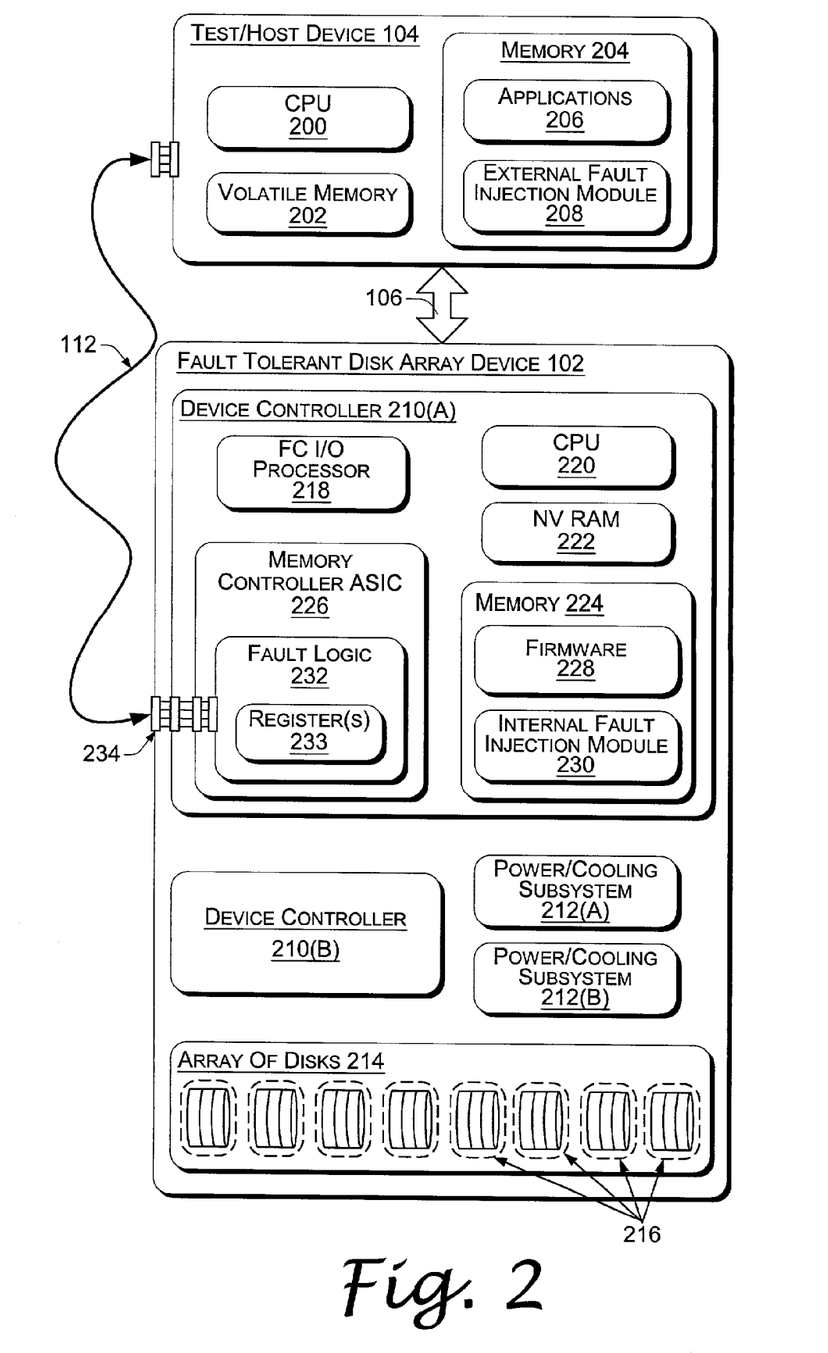
FIG. 2 is a block diagram illustrating in greater detail, an example of a fault tolerant device and a test/host device as might be implemented in the system environment of FIG. 1.

Fault Tolerant Device Generally Embodied as a Fault Tolerant Disk Array Capable of Fault Path Testing Through Automated Error Injection FIG. 2 illustrates in greater detail, an example of a fault tolerant device 102 and test/host device 104 as might be implemented in the system environment 100 of FIG. 1. In the general embodiment of FIG. 2, fault tolerant device 102 is embodied as a fault tolerant disk array 102.

Test/host device 104 typically includes a processor 200, a volatile memory 202 (i.e., RAM), and a non-volatile memory 204 (e.g., ROM, hard disk, floppy disk, CD-ROM, etc.). Nonvolatile memory 204 generally provides storage of computer readable instructions, data structures, program modules and other data for test/host device 104. Test/host device 104 may implement various application programs 206 stored in memory 204 and executed on processor 200 that create or otherwise access data to be transferred via direct communication connection 106 to fault tolerant disk array 102 for storage and subsequent retrieval. Such applications 206 might include software programs implementing, for example, word processors, spread sheets, browsers, multimedia players, illustrators, computer-aided design tools and the like.

Test/host device 104 also includes an external fault injection module 208 stored in memory 204 and executable on processor 200. External fault injection module 208 is configured to inject faults/errors into fault tolerant disk array 102 via independent error injection port 234 as more fully discussed herein below. As mentioned above, test/host device 104 may be a host computer that is supported by fault tolerant device 102, or it may simply be a temporary test computer coupled to fault tolerant device 102 to facilitate fault/error injection testing.

Fault tolerant disk array 102 is generally designed to provide continuous data storage and data retrieval under various fault conditions for computer devices such as remote device(s) 108 and test/host device 104 of FIG. 1. Thus, fault tolerant disk array 102 typically includes redundant subsystems such as controllers 210(A) and 210(B) and power and cooling subsystems 212(A) and 212(B) that permit continued access to the disk array 102 even during a failure of one of the subsystems. In addition, fault tolerant disk array 102 typically provides hot-swapping capability for array components (i.e. the ability to remove and replace components while the disk array 102 remains online) such as controllers 210(A) and 210(B), power/cooling subsystems 212(A) and 212(B), and disk drives 216 in the array of disks 214.

Controllers 210(A) and 210(B) on fault tolerant disk array 102 mirror each other and are generally configured to redundantly store and access data on disk drives 216. Thus, controllers 210(A) and 210(B) perform tasks such as attaching validation tags to data before saving it to disk drives 216 and checking the tags to ensure data from a disk drive 216 is correct before sending it back to test/host device 104 or remote device 108. Controllers 210(A) and 210(B) also tolerate faults such as disk drive 216 failures by recreating data that may be lost due to such failures.

Controllers 210 on fault tolerant disk array 102 typically include I/O processor(s) such as FC (fiber channel) I/O processor(s) 218, main processor(s) 220, nonvolatile (NV) RAM 222, non-volatile memory 224 (e.g., ROM), and one or more ASICs (application specific integrated circuits) such as memory controller ASIC 226. NV RAM 222 is supported by a battery backup (not shown) that preserves data in NV RAM 222 in the event power is lost to controller(s) 210. Nonvolatile memory 224 generally provides storage of computer readable instructions, data structures, program modules and other data for fault tolerant disk array 102.

Nonvolatile memory 224 thus includes firmware 228 and internal fault injection module firmware 230. Firmware 228 is generally configured to execute on processor(s) 220 and support normal disk array 102 operations. Firmware 228 additionally contains portions of code dedicated to handling various fault scenarios that may arise in fault tolerant disk array 102. Firmware 228 therefore contains many fault paths that are executed only when specific faults occur at specific times during the operation of disk array 102. Internal fault injection module 230 is configured to execute on processor(s) 220 and inject faults/errors into the fault logic 232 on memory controller ASIC 226 as more fully discussed herein below.

FC I/O processor(s) 218 receives data and commands from test/host device 104 and/or remote device(s) 108 via direct communication link 106 or network connection 110. FC I/O processor(s) 218 communicate with main processor(s) 220 through standard protocols and interrupt procedures to transfer data and commands to redundant controller 210(B) and generally move data between NV RAM 222 and various disk drives 216 to ensure that data is stored redundantly.

Memory controller ASIC 226 generally controls communication between mirrored controllers 210(A) and 210(B). Memory controller ASIC 226 handles tagging of data sectors being striped to disks in the array of disks 214 and writes parity information across the disk drives 216. Data striping is a process well-known to those skilled in the art which breaks down data into chunks and writes the data in stripe-like patterns across a number of disk drives 216. Using parity to add redundancy is also well-known to those skilled in the art and permits the recreation of data that is lost in the event of a fault such as a disk drive failure.

Memory controller ASIC 226 also includes internal buffers (not shown) that facilitate memory 224 testing to ensure that all regions of mirrored memory (i.e. between mirrored controllers 210(A) and 210(B)) are compared to be identical and checked for ECC (error checking and correction) errors on a regular basis. Memory controller ASIC 226 notifies processor 220 of these and other errors it detects. Firmware 228 executing on processor 220 is configured to manage errors detected by memory controller ASIC 226 in a tolerant manner which may include, for example, preventing the corruption of array 102 data or working around a detected error/fault through a redundant subsystem to prevent the array 102 from crashing.

Fault logic 232 is integrated into memory controller ASIC 226 as circuitry that operates independently from normal ASIC 226 operation. Fault logic 232 effectively makes controller board 210 its own error injection test unit. Fault logic 232 is configured to receive and implement error/fault commands in a manner that simulates faults throughout fault tolerant disk array 102. As discussed more thoroughly below with respect to specific embodiments, error/fault commands can be generated externally on test/host device 104 or internally via internal fault injection module 230. Fault logic 232 may additionally include lock-out key register(s) 233 that must be set up to particular values before the fault logic 232 is enabled for error injection, also as discussed below.

Because fault logic 232 operates independently of normal ASIC 226 operation, errors can be initiated in a controlled manner and correlated to specific firmware 228 code paths. Thus, fault logic 232 permits the testing and verification of virtually every fault path that exists within firmware 228. In addition, no firmware 228 modifications are needed for error injection. This permits a test of the "final" firmware 228 code before a disk array 102 is shipped. Furthermore, because the fault logic 232 is integrated into memory controller ASIC 226, errors internal to ASIC 226 can be generated that are impossible to inject externally. Integration of fault logic 232 onto memory controller ASIC 226 also means that hardware modifications are not needed for error injection testing. Thus, busses, interconnects, and the like within the disk array 102 that otherwise might be excluded from error injection testing due to their inability to tolerate the addition of controller board 210 modifications, can now be included in error injection testing.

Other features common to the fault logic 232 in both of the embodiments discussed herein below, include an ability to avoid physical damage to controller 210 electronics during fault injection through "drive-fight avoidance", and an ability to protect system data through "controller fencing".

"Drive-fight avoidance" designed into fault logic 232 controls electronics on controller 210 so that during fault injection testing, circumstances are not artificially created in which controller 210 I/O pads on various ASIC and other integrated circuit devices do not fight each other by trying to drive each other toward unmatched voltage potentials. This is a problem in fault injection testing that can result in integrated circuit output pads driving other electronics with high currents that can ultimately damage or destroy controller electronics. The drive-fight avoidance designed into fault logic 232 avoids this problem.

"Controller fencing" is a way of fencing off a controller 210 that has experienced a fault, and as a result of that fault, is causing problems within the disk array 102 that can result in harm such as the loss or destruction of user data. Under such circumstances, a good controller 210 (e.g., controller 210(A)) can employ fault logic 232 to inject various faults into memory controller ASIC 226 that will result in the disablement of interfaces to the bad controller (e.g., controller 210(B)). The bad controller is then effectively "fenced off" or logically removed from the disk array 102 and is rendered incapable of performing any operations, good or bad.

Figure 3:
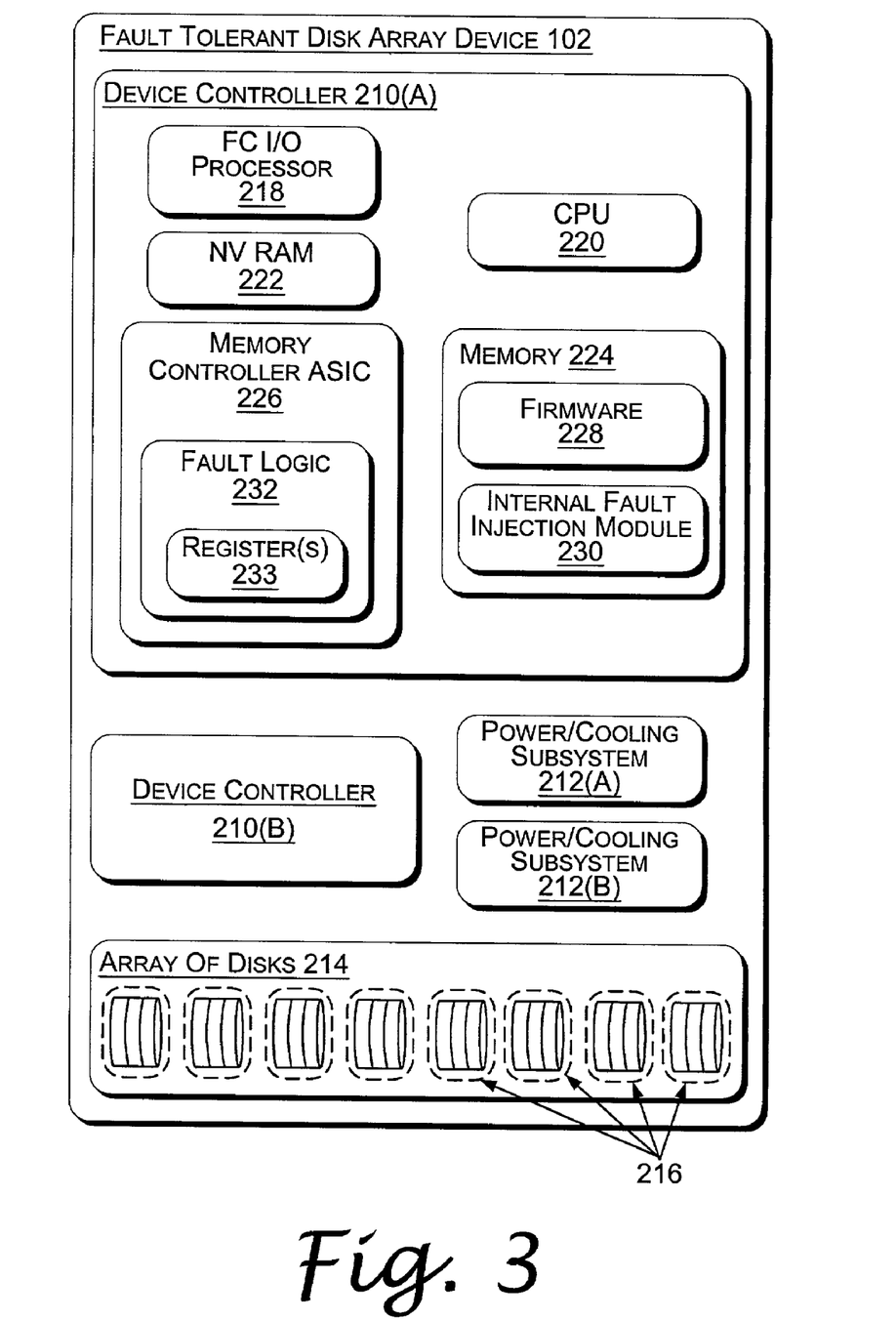
FIG. 3 illustrates a particular embodiment of a fault tolerant device such as that shown in FIG. 2 that is suitable for fault path testing through automated error injection.

Exemplary Embodiments for Fault Path Testing of a Fault Tolerant Disk Array Through Automated Error Injection FIG. 3 shows a first specific embodiment of a fault tolerant disk array device 102 as generally illustrated in FIG. 2. In the embodiment of FIG. 3, automatic error/fault injection is implemented in fault tolerant disk array 102 during a power-on self-test of the disk array 102. Fault tolerant disk array 102 must pass the self-test before hardware can begin functioning as part of normal system operations. In this embodiment, automatic error/fault injection occurs in fault tolerant disk array 102 independent of other devices that may be coupled to the disk array 102, such as test/host device 104 or remote device 108. That is, there is no error/fault injection emanating from an external test/host device 104 through independent injection port 234. Thus, the first specific embodiment of a fault tolerant disk array device 102 as shown in FIG. 3 is a more fundamental representation of the fault tolerant disk array 102 of FIG. 2 that does not include elements useful for automatic error/fault injection from external test/host device 104. As such, error/fault injection elements from FIG. 2 not illustrated in the embodiment of FIG. 3 include external fault injection module 208 on test/host device 104, independent connection 112, and independent error injection port 234.

In the FIG. 3 embodiment of fault tolerant disk array device 102, automatic error/fault injection is performed as part of a self-test during power-on or boot-up of disk array 102. The automatic error/fault injection occurs through execution of internal fault injection module 230 on processor 220. The automatic error/fault injection primarily tests hardware in disk array 102 to ensure that faults can be properly detected and corrected. Generally, during the boot up of the disk array 102, processor 220 (executing fault module 230) calls upon fault logic 232 to inject faults into the system to determine if controller 210 is operating correctly. Processor 220 checks the integrity of controller 210 hardware and confirms that fault detection circuitry within memory controller ASIC 226 is operational. More specifically, internal fault injection module 230 executes on processor 220 to inject error/fault commands into fault logic 232, which implements the commands to force faults within the disk array 102. By virtue of the known injected error, processor 220 "expects" an appropriate response from memory controller ASIC 226 indicating that an error has been detected. In addition, the disk array's 102 response to the known injected error is exercised and validated. Thus, fault detection and tolerance mechanisms of the fault tolerant disk array 102 are verified through automated error/fault injection implemented through fault logic 232 and internal fault injection module 230.

Another feature of the fault logic 232 illustrated in the FIG. 3 embodiment is protection from unauthorized use of the fault logic for fault injection. Fault logic 232 includes lock-out key register(s) 233 that must be loaded with particular key values before the fault logic 232 is enabled to inject faults. Therefore, prior to injecting error commands into fault logic 232, processor 220 first sends one or more lock-out key codes to register(s) 233. If the key codes are correct, the fault logic 232 is enabled to inject faults. Otherwise, fault logic 232 remains disabled and will not inject faults.

Figure 4:
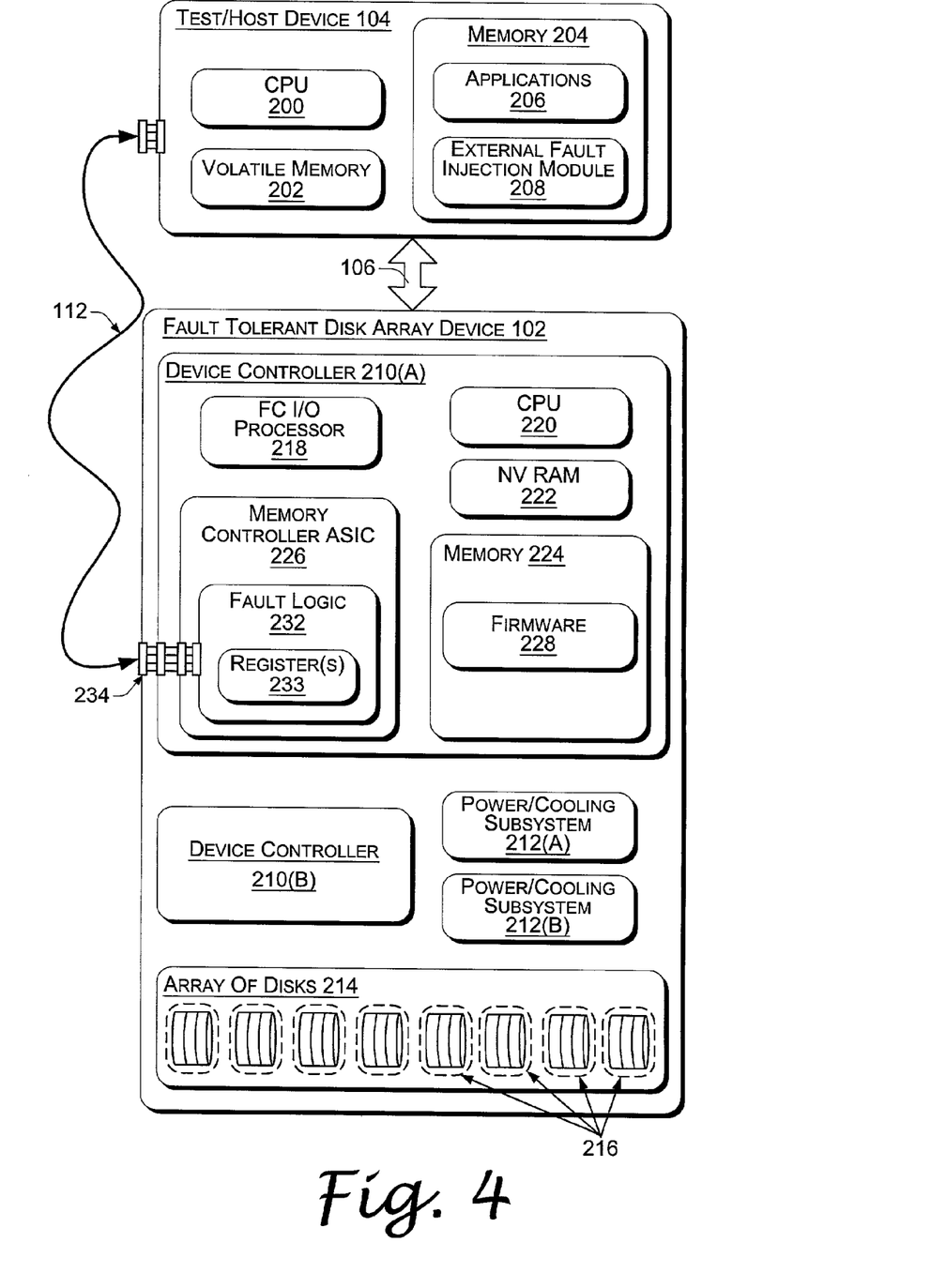
FIG. 4 illustrates another embodiment of a fault tolerant device such as that shown in FIG. 2 that is suitable for fault path testing through automated error injection.

FIG. 4 shows a second specific embodiment of a fault tolerant disk array device 102 as generally illustrated in FIG. 2. In the embodiment of FIG. 4, automatic error/fault injection is implemented in fault tolerant disk array 102 during normal operation of the disk array 102 following the power-on/boot-up process. The automatic error/fault injection in the current embodiment primarily tests the firmware 228 in memory 224 and hardware of disk array 102 to exercise and validate the numerous fault paths within the firmware 228 code. Accordingly, internal fault injection module 230 is not illustrated in embodiment of FIG. 4. Rather, the embodiment of FIG. 4 emphasizes automatic error/fault injection testing using external test/host device 104.

In the FIG. 4 embodiment, external test/host device 104 is configured to execute external fault injection module 208 to generate error/fault commands. External fault injection module 208 controls the injection of the error/fault commands into fault logic 232 on fault tolerant disk array device 102 via independent error injection port 234. Error injection port 234 is independent of other communication ports that may be used by fault tolerant disk array 102 during normal operation. Fault logic 232 is configured to implement the error/fault commands and force faults within the disk array 102. For example, external test/host device 104 might inject an error command that calls on fault logic 232 to access a particular memory address and modify the data at that memory address in a specific way and at a specific time. When memory controller ASIC 226 detects that there is a data error at this memory address, it notifies processor 220, thereby exercising a particular fault path in firmware 228.

The firmware 228 fault code generally operates in a manner that preserves data integrity and availability of disk array 102 during errors such as the data error just described above. Other typical examples of faults that may be implemented via error injection into fault logic 232 include faults that cause a pin on memory controller ASIC 226 to short to ground or to the Vcc power rail, or faults that simulate an EMI (electromagnetic interference) event causing an ASIC 226 pin to toggle up and down between ground and the Vcc power rail. Thus, fault logic 232 operates to test and validate the fault tolerance of disk array device 102 by implementing error/fault commands injected through independent error injection port 234.

The fault logic 232 illustrated in the FIG. 4 embodiment also includes protection from unauthorized use of the fault logic for fault injection. Fault logic 232 includes lock-out key register(s) 233 that must be loaded with particular key values before the fault logic 232 is enabled to inject faults. Therefore, prior to sending error instructions through error injection port 234, test/host device 104 first sends one or more lock-out key codes to register(s) 233. If the key codes are correct, the fault logic 232 is enabled to inject faults. Otherwise, fault logic 232 remains disabled and will not inject faults.

Exemplary Methods for Validating Fault Tolerance in a Fault Tolerant Device Through Automated Error Injection Example methods for validating fault tolerance in a fault tolerant device will now be described with primary reference to FIGS. 5 and 6. The methods apply generally to the exemplary embodiments of system 100 as discussed above with respect to FIGS. 1–4.

Figure 5:
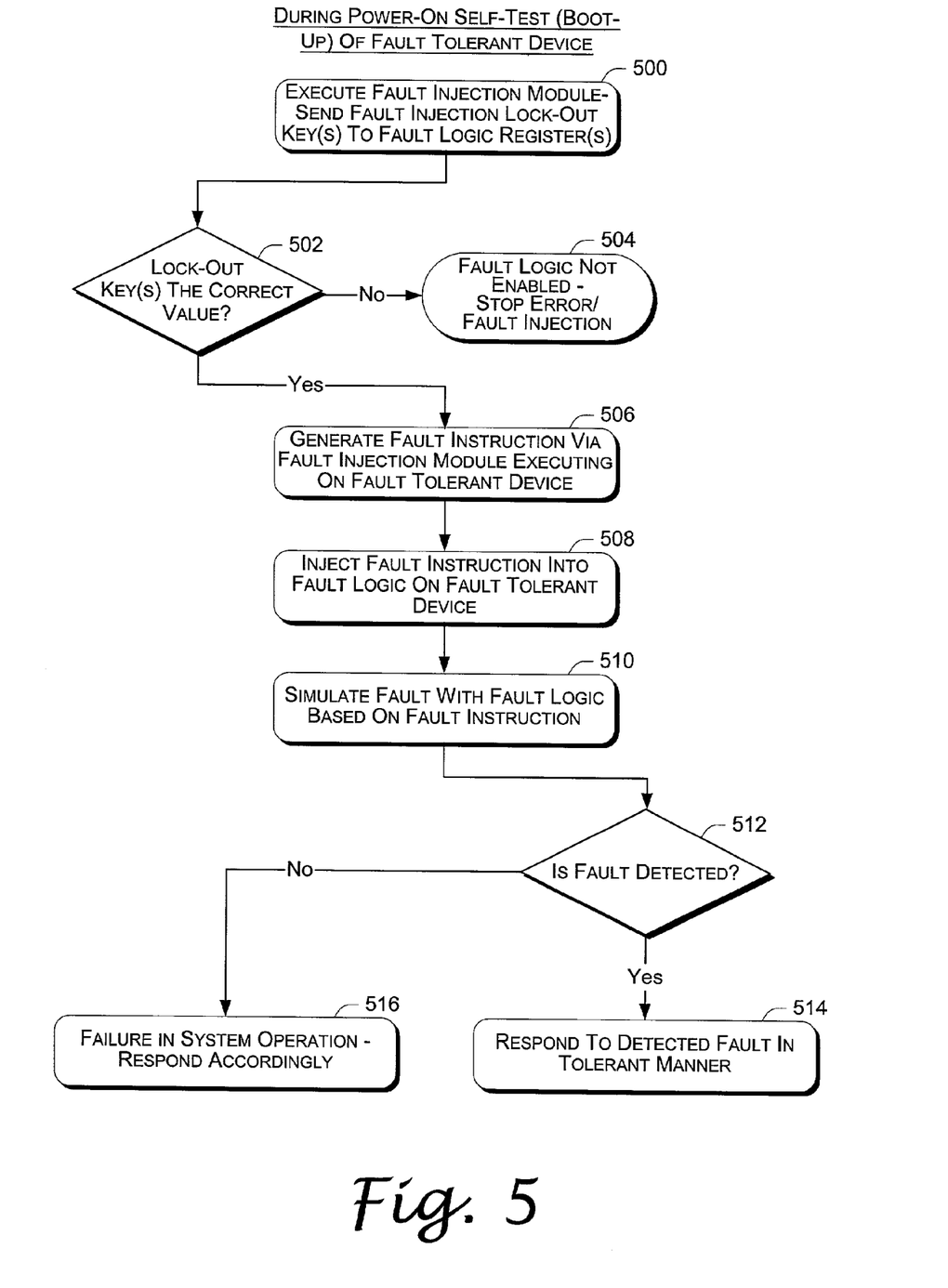
FIG. 5 is a flow diagram illustrating an example method of validating fault tolerance in a fault tolerant device through automated error injection.
Figure 6:
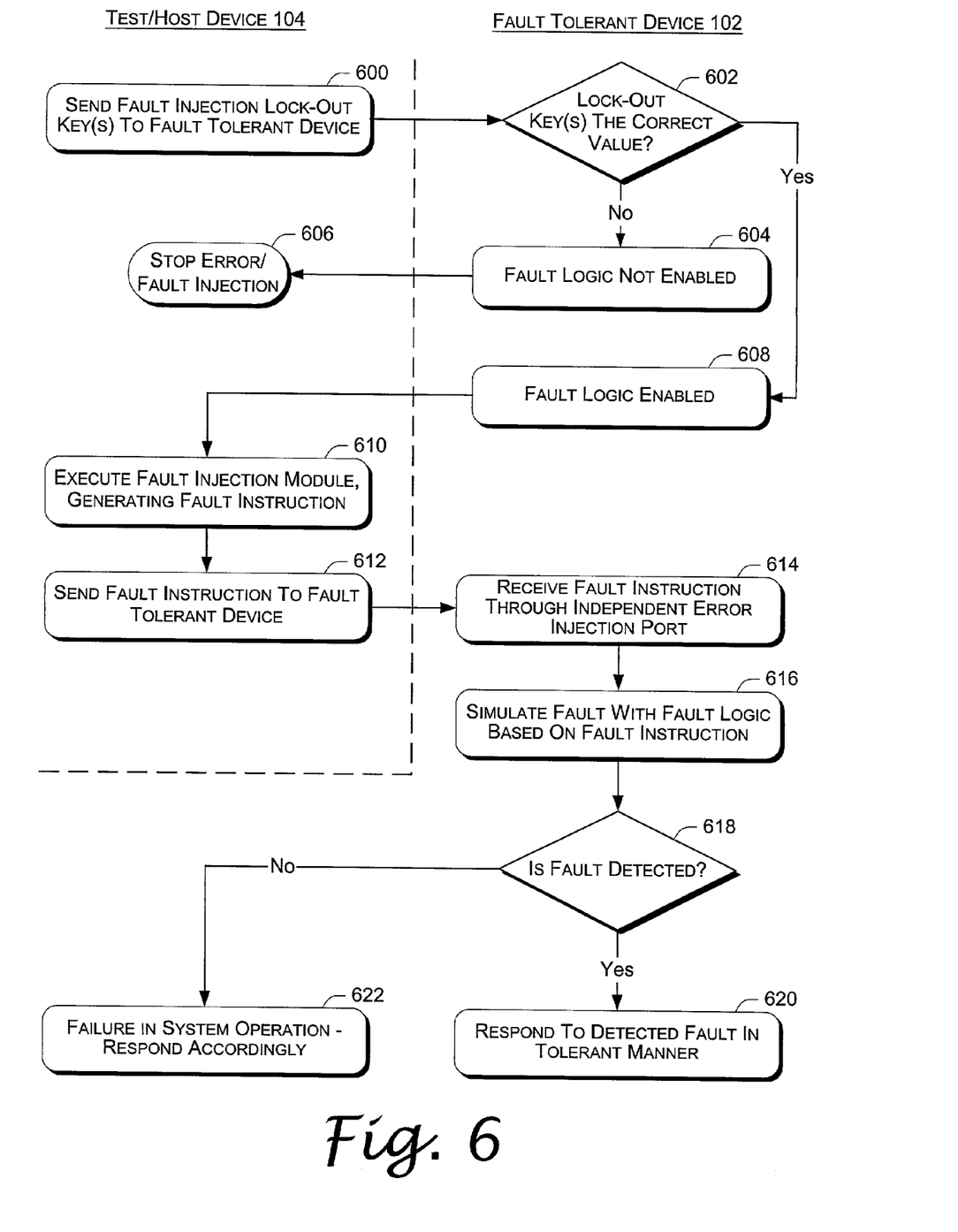
FIG. 6 is a flow diagram illustrating an alternate example method of validating fault tolerance in a fault tolerant device through automated error injection.

FIGS. 5 and 6 are flow diagrams that show examples of general methods for validating fault tolerance in a fault tolerant device through automated error injection. At block 500 of FIG. 5, a fault tolerant device 102 executes a fault injection module 230 and sends one or more fault injection lock-out keys to fault logic register(s) 233 to enable the fault logic 232. A determination is made at block 502 as to whether or not the fault injection lock-out key(s) are the correct value. If the key(s) are not correct, the fault logic 232 is not enabled and the fault/error injection process stops, as shown at block 504.

However, if the fault injection lock-out key(s) are the correct value, the fault injection module executing on fault tolerant device 102 generates a fault instruction as shown at block 506. At block 508, the fault instruction is injected into fault logic 232 on the fault tolerant device 102. At block 510, the fault logic 232 simulates a fault within the fault tolerant device 102 based on the fault instruction. At block 512 a determination is made as to whether the injected fault is properly detected by the device 102. If the fault is detected, the fault tolerant device 102 responds to the detected fault in a tolerant manner at block 514. If the fault is not detected, the fault tolerant device 102 recognizes there has been a failure to detect a known injected fault, and it responds accordingly at block 516.

As noted in FIG. 5, the method illustrated in FIG. 5 is generally performed during a power-on self-test process of a fault tolerant device 102. However, the method illustrated in FIG. 5 is not limited to being performed during a power-on self-test process, but might also be performed at other times during the operation of a fault tolerant device 102. Thus, this disclosure contemplates that a fault injection module 230 executing on fault tolerant device 102 may generate fault instructions for injection into fault logic 232 at times other than during a boot up process of fault tolerant device 102.

FIG. 6 illustrates an alternate example method for validating fault tolerance in a fault tolerant device through automated error injection via a test/host device 104 that is external to the fault tolerant device 102. At block 600 of FIG. 6, a test/host device 104 sends one or more fault injection lock-out keys to the fault tolerant device 102 in order to enable the fault logic 232. A determination is made on the fault tolerant device 102 at block 602 as to whether or not the fault injection lock-out key(s) are the correct value. If the key(s) are not correct, block 604 indicates that fault logic 232 is not enabled, and the fault/error injection process stops at block 606.

However, if the error injection lock-out key(s) are the correct value, the fault logic 232 is enabled at block 608. At block 610, the test/host device 104 executes fault injection module 208 which generates a fault instruction. At block 612, test/host device 104 sends the fault instruction to fault tolerant device 102. At block 614, fault tolerant device 102 receives the fault instruction through an independent error injection port 234. The error injection port 234 is independent of other communication ports that may be used by fault tolerant device 102.

At block 616, fault logic 232 on fault tolerant device 102 simulates a fault within the fault tolerant device 102 based on the fault instruction. A determination is then made at block 618 as to whether or not the simulated/injected fault is properly detected by device 102. If the fault is detected, the fault tolerant device 102 responds to the detected fault in a tolerant manner at block 620. If the fault is not detected, the fault tolerant device 102 recognizes there has been a failure to detect a known injected fault, and it responds accordingly at block 622.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A fault tolerant device comprising:
a controller;
fault logic integrated into the controller,
a fault injection module configured to inject fault commands into the fault logic; and
a controller fencing module configured to detect a bad controller in the fault tolerant device and to inject faults to disable interfaces to the bad controller and fence off the bad controller from the fault tolerant device.

2. A fault tolerant device as recited in claim 1, further comprising:
an independent error injection port through which the fault logic receives fault commands.

3. A fault tolerant device as recited in claim 1, further comprising:
one or more registers integrated into the fault logic to receive one or more error injection lock-out keys.

4. A fault tolerant system comprising:
a fault tolerant device having integrated fault logic, the fault logic configured to simulate faults in the fault tolerant device based on fault commands;
an independent error injection port on the fault tolerant device through which the fault logic receives external fault commands; and
a controller fencing module configured to detect a bad controller in the fault tolerant system and to inject faults to disable interfaces to the bad controller and fence off the bad controller from the fault tolerant system.

5. A fault tolerant system as recited in claim 4, further comprising:
a test device connectable to the fault tolerant device; and
an external fault injection module executable on the test device to generate the external fault commands.

6. A fault tolerant system as recited in claim 4, further comprising:
an internal fault injection module executable on the fault tolerant device to generate internal fault commands and inject the internal fault commands into the fault logic.

7. A fault tolerant disk array comprising:
a controller;
a fault injection module configured to generate fault commands;
fault logic integrated into the controller and configured to simulate faults in the fault tolerant disk array based on fault commands; and
a controller fencing module configured to detect a bad controller in the fault tolerant disk array and to inject faults to disable interfaces to the bad controller and fence off the bad controller from the fault tolerant disk array.

8. A fault tolerant disk array as recited in claim 7, further comprising:
an independent error injection port through which the fault logic receives fault commands.

9. In a fault tolerant system, a controller comprising:
a memory control device to manage data storage and retrieval;
fault logic integrated into the memory control device to interpret fault instructions and simulate faults on the controller; and
a controller fencing module configured to detect a bad controller in the fault tolerant system and to inject faults to disable interfaces to the bad controller and fence off the bad controller from the fault tolerant system.

10. A controller as recited in claim 9, further comprising:
a processor; and
a fault module executable on the processor to generate fault instructions.

11. A controller as recited in claim 9, further comprising:
an independent error injection port to receive fault instructions from an external test device.

12. A method of validating fault tolerance within a fault tolerant device comprising:
receiving a fault instruction through an independent error injection port on the fault tolerant device;
simulating a fault with fault logic integrated into the fault tolerant device based on the fault instruction;
detecting a bad controller in the fault tolerant device; and
injecting faults to disable interfaces to the bad controller and fence off the bad controller from the fault tolerant device.

13. A method as recited in claim 12, wherein the receiving further comprises:
generating the fault instruction in a test device that is external to the fault tolerant device; and
sending the fault instruction from the test device to the fault tolerant device through the independent error injection part.

14. A method as recited in claim 13, wherein the generating further comprises executing a fault module on the test device.

15. A method as recited in claim 12, further comprising:
detecting the fault; and
responding to the fault in a tolerant manner.

16. A method as recited in claim 12, further comprising;
receiving an error injection lock-out key; and
enabling the fault logic based on the error injection lock-out key.

17. A processor-readable medium comprising processor-executable instructions configured for:
receiving a fault instruction through an independent error injection port on a fault tolerant device;
simulating a fault with fault logic integrated into the fault tolerant device based on the fault instruction;
detecting a bad controller in the fault tolerant device; and
injecting faults to disable interfaces to the bad controller and fence off the bad controller from the fault tolerant device.

18. A method of validating fault tolerance in a fault tolerant system comprising:
during a power-up process:
generating an internal fault instruction in a fault tolerant device;
injecting the internal fault instruction into fault logic integrated into the fault tolerant device;
based on the internal fault instruction, simulating a fault in the fault tolerant device with the fault logic;
detecting a bad controller in the fault tolerant device; and
injecting faults to disable interfaces to the bad controller and fence off the bad controller from the fault tolerant device.

19. A method as recited in claim 18, wherein the generating further comprises executing a fault module on a system processor.

20. A method as recited in claim 18, further comprising:
detecting the fault; and
responding to the fault in a tolerant manner.

21. A method as recited in claim 18, further comprising:
receiving an error injection lock-out key; and
enabling the fault logic based on a value of the error injection lock-out key.

22. A method as recited in claim 18, further comprising:
after the power-up process:
generating an external fault instruction in a test device coupled to the fault tolerant device;
injecting the external fault instruction into the fault logic through an independent error injection port on the fault tolerant device; and
simulating a fault with the fault logic based on the external fault instruction.

23. A processor-readable medium comprising processor-executable instructions configured for;
during a power-up process:
generating an internal fault instruction in a fault tolerant device;
injecting the internal fault instruction into fault logic integrated into the fault tolerant device;
based on the internal fault instruction, simulating a fault in the fault tolerant device with the fault logic;
detecting a bad controller in the fault tolerant device; and
injecting faults to disable interfaces to the bad controller and fence off the bad controller from the fault tolerant device.

24. A method of testing a fault tolerant system comprising:
during a system power-up process,
generating an internal fault instruction within the system;
implementing the internal fault instruction with fault logic integrated into the system;
detecting a bad controller in the fault tolerant device; and
injecting faults to disable interfaces to the bad controller and fence off the bad controller from the fault tolerant device; and
after the system power-up process,
receiving an external fault instruction from outside the system; and
implementing the external fault instruction with the fault logic.

25. A method as recited in claim 24, further comprising:
checking a value of an error injection lock-out key; and
enabling the fault logic based on the value of the error injection lock-out key.

26. A method as recited in claim 24, wherein the generating further comprises:
executing a fault module on a system processor, the fault module configured to generate fault instructions; and
injecting the internal fault instruction into the fault logic from the system processor.

27. A method as recited in claim 24, wherein the receiving further comprises:
generating the external fault instruction in an external test device; and injecting the external fault instruction into the fault logic through an independent error injection port on the system.

28. A processor-readable medium comprising processor-executable instructions configured for:
    during a system power-up process,
        generating an internal fault instruction within a fault tolerant system;
        implementing the internal fault instruction with fault logic integrated into the fault tolerant system;
        detecting a bad controller in the fault tolerant device; and
        injecting faults to disable interfaces to the bad controller and fence off the bad controller from the fault tolerant device; and
    after the system power-up process,
        receiving an external fault instruction from outside the fault tolerant system; and
        implementing the external fault instruction with the fault logic.

29. A method of validating fault tolerance in a fault tolerant system comprising:
    generating a fault instruction in a test device;
    injecting the fault instruction into a fault tolerant device through an independent error injection port of the fault tolerant device;
    based on the fault instruction, simulating a fault in the fault tolerant device through fault logic integrated into the fault tolerant device;
    detecting a bad controller in the fault tolerant device; and
    injecting faults to disable interfaces to the bad controller and fence off the bad controller from the fault tolerant device.

30. A method as recited in claim 29, wherein the generating further comprises executing a fault injection module on the test device.

31. A method as recited in claim 29, further comprising:
    detecting the fault; and
    responding to the fault in a tolerant manner.

32. A method as recited in claim 29, further comprising:
    loading an error injection lock-out key into the fault tolerant device; and
    based on the error injection lock-out key, enabling the simulating.

* * * * *

UNITED STATES PATENT AND TRADEMARK OFFICE
CERTIFICATE OF CORRECTION

PATENT NO. : 7,020,803 B2 Page 1 of 1
APPLICATION NO. : 10/097054
DATED : March 28, 2006
INVENTOR(S) : Dale Haddon Wolin et al.

It is certified that error appears in the above-identified patent and that said Letters Patent is hereby corrected as shown below:

Title page, Item (73), in "Assignee", delete "LP.," and insert -- L.P., --, therefor.

In column 10, line 14, in Claim 1, after "controller" delete "," and insert -- ; --, therefor.

In column 11, line 35, in Claim 13, delete "part" and insert -- port --, therefor.

In column 11, line 42, in Claim 16, after "comprising" delete ";" and insert -- : --, therefor.

In column 12, line 24, in Claim 23, after "for" delete ";" and insert -- : --, therefor.

Signed and Sealed this

Thirteenth Day of July, 2010

David J. Kappos
*Director of the United States Patent and Trademark Office*